H. F. SNYDER.
DUMPING WAGON.
APPLICATION FILED JULY 2, 1908.
1,038,796.
Patented Sept. 17, 1912.
2 SHEETS—SHEET 2.
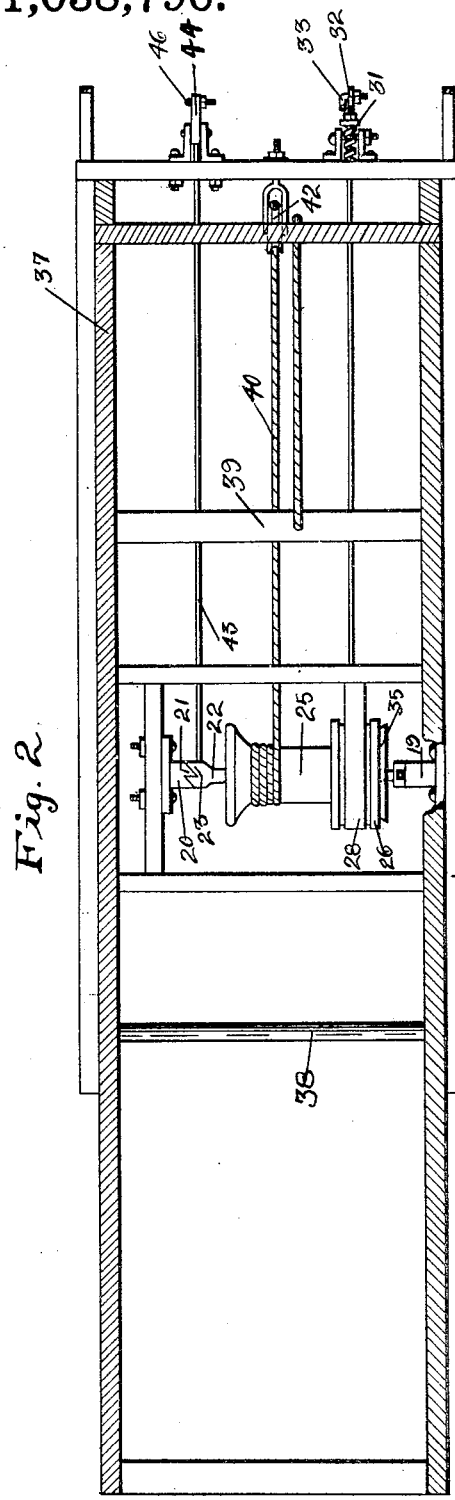
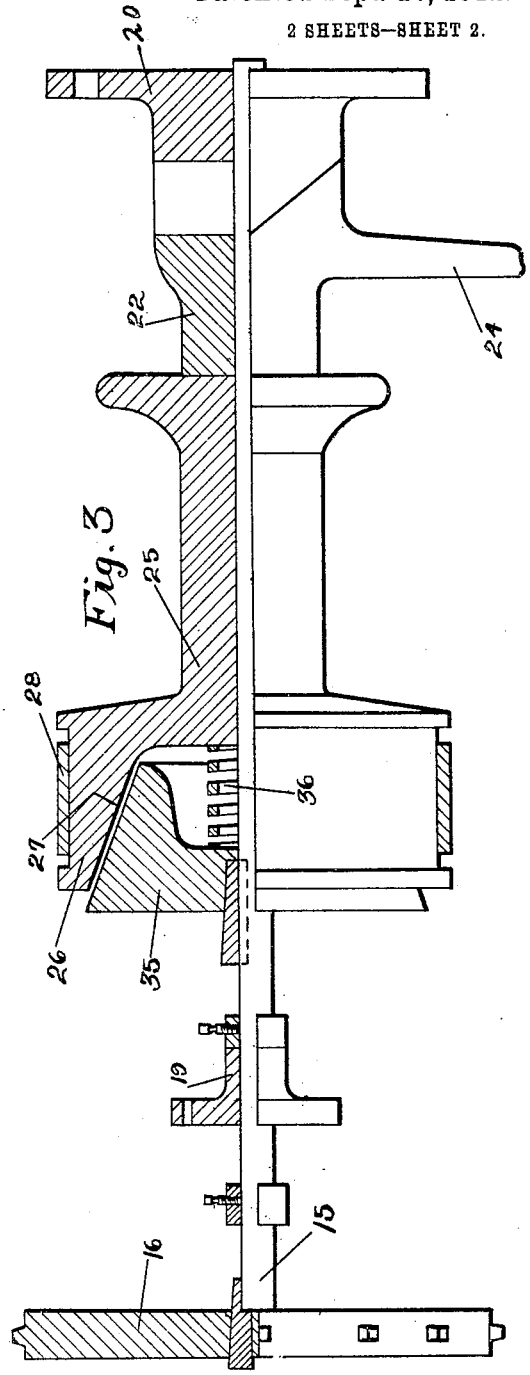
Witnesses
F. C. Caswell
A. G. Hague
Inventor
Howard F. Snyder
by Orwig & Lane, Att'ys

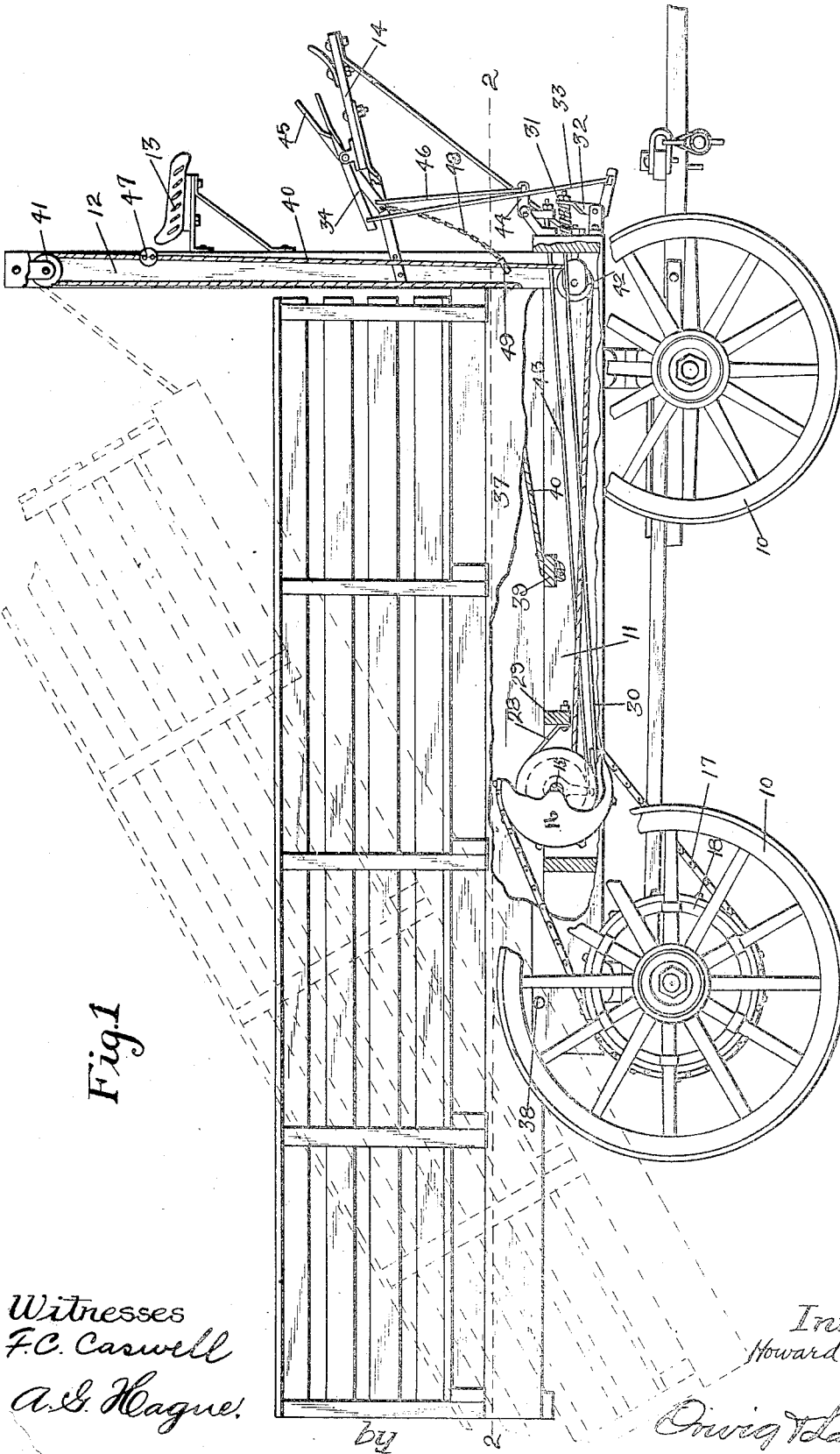

UNITED STATES PATENT OFFICE.

HOWARD F. SNYDER, OF NEWTON, IOWA, ASSIGNOR TO FRED L. MAYTAG, OF NEWTON IOWA.

DUMPING-WAGON.

1,038,796.   Specification of Letters Patent.   Patented Sept. 17, 1912.

Application filed July 2, 1908. Serial No. 441,648.

*To all whom it may concern:*

Be it known that I, HOWARD F. SNYDER, a citizen of the United States, residing at Newton, in the county of Jasper and State of Iowa, have invented a certain new and useful Dumping-Wagon, of which the following is a specification.

The object of my invention is to provide a dumping wagon of simple, durable and inexpensive construction so arranged that the operator riding upon the wagon may, upon approaching the point where it is desired to dump, operate a lever to thereby cause the machinery carried by the wagon and operated by a traction wheel thereof to elevate the forward end of the wagon and to dump the load at the point desired.

A further object is to provide means for automatically stopping the tilting movement of the wagon bed, when it has reached its limit of movement, and thereby prevent breakage of the tilting wagon bed or any of the operative parts which might otherwise be caused by the failure of the operator to release the tilting mechanism.

A further object is to provide simple, durable and inexpensive means for controlling the return movement of the tilting wagon bed.

Further objects will appear hereafter in the following description.

My invention consists in the construction, arrangement and combination of the various parts of the device, whereby the objects contemplated are attained, as hereinafter more fully set forth, pointed out in my claims, and illustrated in the accompanying drawings, in which—

Figure 1 shows a side elevation of a wagon embodying my invention with parts broken away to show certain details of construction. The dotted lines in said figure show the position of the wagon bed when dumping. Fig. 2 shows a horizontal sectional view through the sides of the dumping wagon bed to illustrate the mechanism for tilting the wagon bed. Fig. 3 shows an enlarged detail view, partly in section, of the winding drum shaft and parts attached thereto.

Referring to the accompanying drawings I have used the reference numeral 10 to indicate the running gear of the wagon which is of the ordinary construction.

Mounted on the running gear is a stationary wagon bed 11, having at its forward end the upright frame 12, upon which are mounted the driver's seat, 13, and the foot board 14.

Rotatably mounted in the stationary wagon bed 11 is a shaft 15, having keyed to one end thereof a sprocket wheel 16. This sprocket wheel 16 is connected by a sprocket chain 17 with a sprocket wheel 18 fixed to one of the traction wheels, so that when the wagon is advanced the shaft 15 will be constantly rotated.

Adjacent to the sprocket wheel 16 is a bearing 19 secured to the stationary wagon bed 11, and on the other end of the shaft 15 is a bearing 20 secured to the wagon bed 11. This bearing 20 is provided at one end with one or more inclined teeth or lugs 21, shaped similar to the teeth on a ratchet clutch.

Adjacent to the bearing 20 is a hub 22 rotatably mounted on the shaft and provided with teeth 23 to coact with the teeth 21. This hub 22 is also provided with a downwardly projecting arm 24, and said parts are so arranged that when the arm is moved forwardly the hub 22 will be moved longitudinal of the shaft 15 away from the bearing 20 on account of said inclined teeth. The purpose of this longitudinal movement will be made clear hereinafter, and it is only necessary that this movement be comparatively slight in order to accomplish the purposes for which it is intended.

Loosely mounted upon the shaft 15, adjacent to the hub 22 is a drum 25, one end of the drum being in engagement with the hub 22 and the other end of the drum being provided with a flange 26 having a tapered interior 27, and also having its periphery shaped to receive a band brake. This band brake is indicated by the numeral 28 and is attached at one end to a stationary cross piece 29, and is then passed upwardly and rearwardly over the flange 26, and its other end extends forwardly below the flange 26 as clearly shown in Fig. 1, and the rod 30 is attached to the latter end of the band brake. This rod extends forwardly and is provided at its forward end with a spring 31 which normally holds it to its forward limit of movement and hence normally holds the band brake tight upon the flange 26, and thereby prevents rotation of the drum 25.

In order to release the band brake I provide a bell-crank lever 32 having a rod 33 attached to it and connected to a foot lever 34 on the foot rest 14, the parts being so arranged that when the foot lever 34 is depressed the spring 31 will be compressed as required to release the band brake.

Fixed to the shaft 15, adjacent to the flange 26 is a cone shaped member 35 so arranged that when the flange 26 is moved longitudinal of the shaft by means of the hub 22, the said flange will frictionally engage the cone 35 so that the drum will be rotated in unison with the cone.

Between the drum and cone I have placed an expansible coiled spring 36 for normally holding the drum out of engagement with the cone.

Mounted on top of the stationary wagon bed 11 is a tilting wagon bed 37, pivotally connected with the wagon bed 11 by a pivot pin 38. This pivot pin is arranged in the rear of the center of the wagon bed 37 so that the major portion of the weight of the wagon bed 37 is in advance of said pivotal point.

Beneath the wagon bed 37 is a cross piece 39 attached to the wagon bed 37. Fixed to this cross piece is a rope or cable 40 extended forwardly under the wagon bed 37 and then upwardly over a pulley 41 at the top of the upright frame 12, then downwardly under a pulley 42 at the forward portion of the stationary wagon bed 11, and then rearwardly to the drum 25, its rear end being fixed to and wound upon said drum. By this arrangement it is obvious that when the drum is rotated by the shaft 15 the rope or cable will be wound upon it and the forward end of the wagon bed will be elevated.

I have provided for operating the arm 24 as required to throw the drum into operation as follows: Pivoted to the lower end of the arm 24 is a rod 43 extended forwardly and connected to a bell-crank lever 44. A foot lever 45 is mounted upon the foot rest 14 and connected by a link 46 with the bell-crank 44, hence when said lever 45 is depressed the drum 25 is moved to position in engagement with the cone 35 and is thereby rotated with the shaft 15. If the operator should for any reason fail to release the lever 45 when the tilting wagon bed is at its limit of movement, the tilting wagon bed would be elevated too far and injury to the device might possibly result. To prevent this I have provided automatic means for stopping the movement of the tilting wagon bed when it has reached its upper limit as follows: Fixed to the rope or cable 40 is a stop 47, and attached to the foot lever 45 is a chain 48, having a loop 49 on one end through which the rope or cable 40 is passed. These parts are so arranged that when the stop 47 engages the loop 49 it will automatically move the lever 45 to position for raising the operator's foot, and thereby permitting the spring 36 to throw the drum 25 out of frictional contact with the cone 35.

In practical use the wagon is moved over a field and is loaded in the ordinary manner. When it is desired to discharge the contents of the wagon the operator presses upon the foot lever 45 and thereby causes the drum 25 to be rotated in the direction required for winding up the rope or cable and tilting the wagon bed. When it has been tilted to its limit the movement is automatically stopped and the operator's foot is raised so that if for any reason the operator should fail to release the lever 45 at the proper time it will be released automatically.

The wagon bed will be automatically held in any position in which it is placed by the band brake 28 so that after the load is discharged and the drum 25 released from engagement with the cone 35, the wagon bed will not drop to its normal position; it will, however, return by gravity to its horizontal position if the operator presses upon the foot lever 34; hence the return movement of the wagon bed is entirely within the control of the operator and may be accomplished slowly and easily without any shock or jar to the wagon.

By the construction herein disclosed the operator while seated upon the wagon may readily and easily dump the contents of the wagon and cause the wagon bed to be returned to its normal position without leaving the seat and without stopping the wagon.

I claim as my invention.

1. In a device of the class described, the combination of a wagon-bed carrying at its rear end a pivot, a tilting wagon bed mounted to swing on said pivot, a rope and windlass connected to lift the front of said tilting bed when desired, a friction drive for said windlass controlled from the front end of said first named wagon-bed, and a friction brake adjusted to said windlass and controlled from the front of said wagon-bed, said brake being adapted to control the return movement of said tilting bed when it drops back under the action of gravity.

2. In a device of the class described, the combination of a wagon bed provided with running gear, a tilting wagon bed pivoted on said first-mentioned wagon bed, tilting mechanism, means for operatively connecting said mechanism with the running gear, means for controlling said connections, and a spring-actuated friction brake for holding the tilting wagon bed in any position of its movement.

3. In a device of the class described, the combination of a wagon bed provided with running gear, a tilting wagon bed pivoted on said first-mentioned wagon bed, tilting mechanism, means for operatively connecting said mechanism with the running gear, foot-controlled means for controlling said connections, a spring-actuated friction brake for normally holding the tilting wagon bed in any position of its movement, and foot-operated means arranged to act in opposition to said spring-actuated means when the tilting body is to be returned to its initial position.

4. In a device of the class described, the combination of a wagon bed, supporting wheels therefor, a shaft mounted therein, means for rotating said shaft by power from a supporting wheel, a drum on said shaft, means for throwing said drum into and out of operative engagement with the shaft, a rope or cable fixed to and wound upon the shaft, an elevated support on the wagon bed, a pulley thereon having said rope or cable passed over it, and a tilting wagon bed pivoted on the stationary wagon bed, having said rope or cable attached to its forward portion, and a spring for normally holding the drum in position out of operative engagement with the shaft.

5. In a device of the class described, the combination of a wagon bed, supporting wheels therefor, a shaft mounted therein, means for rotating said shaft by power from a supporting wheel, a drum on said shaft, means for throwing said drum into and out of operative engagement with the shaft, a rope or cable fixed to and wound upon the shaft, an elevated support on the wagon bed, a pulley thereon having said rope or cable passed over it, and a tilting wagon bed on the stationary wagon bed, having said rope or cable attached to its forward portion, and a spring for normally holding the drum in position out of operative engagement with the shaft, a stop attached to said rope or cable, a means actuated by said stop for automatically throwing the drum to position out of operative engagement with the shaft.

6. In a device of the class described, the combination of a wagon bed, supporting wheels therefor, a shaft mounted therein, means for rotating said shaft by power from a supporting wheel, a drum on said shaft, means for throwing said drum into and out of operative engagement with the shaft, a rope or cable fixed to and wound upon the shaft, an elevated support on the wagon bed, a pulley thereon having said rope or cable passed over it, and a tilting wagon bed on the stationary wagon bed, having said rope or cable attached to its forward portion, and a spring for normally holding the drum in position out of operative engagement with the shaft, a stop attached to said rope or cable, a means actuated by said stop for automatically throwing the drum to position out of operative engagement with the shaft, a band brake connected with the drum and means for controlling the band brake, said means comprising a spring for tightening the band brake and a manually operated lever for releasing it.

Des Moines, Iowa, June 18th, 1908.

HOWARD F. SNYDER.

Witnesses:
GEO. CAMPBELL,
L. B. MAYTAG.

Copies of this patent may be obtained for five cents each, by addressing the "Commissioner of Patents, Washington, D. C."